United States Patent
Groendahl et al.

(10) Patent No.: US 11,643,738 B2
(45) Date of Patent: May 9, 2023

(54) ELECTROLYSIS ARRANGEMENT

(71) Applicant: Siemens Gamesa Renewable Energy A/S, Brande (DK)

(72) Inventors: Erik Groendahl, Them (DK); Mogens Lund, Videbaek (DK); Jan Thisted, Tjele (DK)

(73) Assignee: SIEMENS GAMESA RENEWABLE ENERGY A/S

(*) Notice: Subject to any disclaimer, the term of this patent is extended or adjusted under 35 U.S.C. 154(b) by 0 days.

(21) Appl. No.: 17/209,322

(22) Filed: Mar. 23, 2021

(65) Prior Publication Data

US 2021/0301410 A1   Sep. 30, 2021

(30) Foreign Application Priority Data

Mar. 30, 2020 (EP) .................................. 20166573

(51) Int. Cl.
| | |
|---|---|
| *C25B 9/65* | (2021.01) |
| *C25B 1/04* | (2021.01) |
| *C25B 9/70* | (2021.01) |
| *C25B 15/02* | (2021.01) |

(52) U.S. Cl.
CPC ............... *C25B 9/65* (2021.01); *C25B 1/04* (2013.01); *C25B 9/70* (2021.01); *C25B 15/02* (2013.01)

(58) Field of Classification Search
CPC .... C25B 1/04; C25B 9/65; C25B 9/70; C25B 15/02
See application file for complete search history.

(56) References Cited

U.S. PATENT DOCUMENTS

| | | |
|---|---|---|
| 2008/0127646 A1 | 6/2008 | Doland |
| 2008/0236647 A1 | 10/2008 | Gibson et al. |
| 2010/0114395 A1 | 5/2010 | Hinatsu et al. |
| 2013/0020192 A1 | 1/2013 | Carpenter |

(Continued)

FOREIGN PATENT DOCUMENTS

| | | | | |
|---|---|---|---|---|
| CN | 102185550 A | * | 9/2011 | ................ H02P 9/14 |
| CN | 101275236 B | | 5/2012 | |
| CN | 102264950 B | | 12/2013 | |

(Continued)

OTHER PUBLICATIONS

European Search Report dated Oct. 15, 2020 for application No. 20166573.4.

*Primary Examiner* — Ciel P Contreras
(74) *Attorney, Agent, or Firm* — Schmeiser, Olsen & Watts LLP

(57) ABSTRACT

Provided is an electrolysis arrangement including a plurality of electrolytic units, wherein each electrolytic unit includes an electrolytic cell and an AC-DC power converter configured to provide DC power for that electrolytic cell; a plurality of electrolytic assemblies, wherein each electrolytic assembly includes a number of electrolytic units; at least one wind turbine including an electrical generator with a number of armature windings, wherein each armature winding provides AC power to one electrolytic assembly; and a converter unit controller configured to regulate the AC-DC power converters of the electrolytic units on the basis of the power output of an electrical generator. A method of operating such an electrolysis arrangement is also provided.

18 Claims, 3 Drawing Sheets

(56) References Cited

U.S. PATENT DOCUMENTS

2013/0317959 A1 11/2013 Joos et al.
2020/0002823 A1 1/2020 Ono et al.

FOREIGN PATENT DOCUMENTS

| | | |
|---|---|---|
| CN | 104113084 B | 1/2016 |
| CN | 206768235 U | 12/2017 |
| CN | 109004665 A | 12/2018 |
| JP | 2005027361 A | 1/2005 |
| JP | 2006345649 A | 12/2006 |
| JP | 2013231381 A | 11/2013 |
| JP | 2016226238 A | 12/2016 |
| JP | 2019163530 A | 9/2019 |
| JP | 2019198221 A | 11/2019 |
| WO | 2018202926 A1 | 11/2018 |

* cited by examiner

ELECTROLYSIS ARRANGEMENT

CROSS-REFERENCE TO RELATED APPLICATIONS

This application claims priority to EP Application No. 20166573.4, having a filing date of Mar. 30, 2020, the entire contents of which are hereby incorporated by reference.

FIELD OF TECHNOLOGY

The following relates to an electrolysis arrangement, and a method of operating an electrolysis arrangement.

BACKGROUND

An electrolytic cell uses electricity to separate elements from a naturally occurring substance. For example, hydrogen and oxygen can be separated out from water. The electrolytic conversion of carbon dioxide can be used to produce various commercial products such as methane or ethylene.

Electrolysis requires a DC voltage and current. However, an electrolysis plant is generally powered by AC grid electricity. Therefore, the overall efficiency of the electrolysis is determined by the various transformation stages, e.g., step-down transformation and AC-DC conversion at the electrolysis plant.

For environmental reasons, it is desirable to use renewable energy sources instead of fossil fuels. Wind energy is becoming more prevalent as a power supply, and electricity from many offshore wind farms is being fed into the electricity grid. This means that the overall efficiency of the electrolysis is further reduced by additional transformation stages, e.g., AC-DC-AC conversion at wind turbine level, step-up transformation at wind turbine level, step-up transformation at wind park level, step-down transformation at the distribution network level.

Another aspect to consider is the fluctuating nature of wind power. In low-wind or storm conditions, wind parks may not be able to deliver sufficient power. During such times, the electricity delivered to the electrolysis facility may originate from a non-renewable source.

SUMMARY

An aspect relates to provide a more energy-efficient way of performing electrolysis.

According to embodiments of the invention, the electrolysis arrangement comprises a plurality of electrolytic units, wherein each electrolytic unit comprises an electrolytic cell and an AC-DC power converter configured to provide DC power for that electrolytic cell; a plurality of electrolytic assemblies, wherein each electrolytic assembly comprises a number of electrolytic units; at least one wind turbine comprising an electrical generator with a number of armature windings, wherein each armature winding provides AC power to one electrolytic assembly; and a converter unit controller configured to regulate the AC-DC power converters of the electrolytic units on the basis of the power output of an electrical generator.

As used in the context of embodiments of the invention, an electrolytic unit may be understood to comprise one or more electrolytic cells. An arrangement in which two or more electrolytic cells are driven by a common power supply is generally referred to as an "electrolytic stack". In the following, the terms "electrolytic cell", "cell", "electrolytic stack" and "stack" may be used interchangeably.

In the context of embodiments of the invention, it shall be understood that a wind turbine of the electrolysis arrangement is dedicated to performing electrolysis, i.e. any electrical power generated by that wind turbine will be used essentially exclusively to drive the electrolytic units. In other words, a wind turbine of the inventive electrolysis arrangement is not used for the conventional purpose of selling electricity, and the electricity is for "local" consumption only. While the electrical power generated by a wind turbine of the inventive electrolysis arrangement will be used essentially exclusively to drive the electrolytic units, it shall be understood that a relatively small fraction of the electrical power generated by a wind turbine will be used to power various components of the wind turbine such as a cooling system, air-conditioning system, wind turbine controller, etc.

An advantage of the inventive electrolysis arrangement is that the AC-DC power converters can be individually controlled in order to distribute the available power in an optimum manner. The power output of the electrical generator can be determined by a wind turbine controller (WTC) or park controller, which can inform the converter unit controller accordingly. For example, depending on the available power (which in turn may depend largely on the wind speed), a specific number of electrolytic cells can operate at full capacity, leaving all other cells "off"; all electrolytic cells can operate at a fraction of full capacity; some electrolytic cells can operate at full capacity while others operate at partial capacity, etc. In this way, the efficiency of the electrolysis arrangement can be optimized.

According to embodiments of the invention, the method of operating such an electrolysis arrangement comprises the steps of operating the electrical generator of a wind turbine to generate AC power in one or more of its armature windings and, on the basis of the generated AC power, regulating the AC-DC power converters of the electrolytic units of the electrolytic assemblies connected to those windings.

An advantage of the inventive method is that the available wind energy can be used very efficiently. It is relatively easy to determine how much power can be generated by a wind turbine under specific wind conditions, and this information is used by the present method to determine an optimum distribution of the available power.

In the following, the terms "electrolytic unit" and "unit" may be used interchangeably. Similarly, the terms "electrolytic assembly" and "assembly" may be used interchangeably.

Electrolysis requires a sufficiently high DC current. In an embodiment of the invention, the AC-DC power converter of an electrolytic unit comprises a DC current controller configured to control the current density in the corresponding electrolysis stack, which determines the electrocatalytic conversion speed. In an embodiment of the invention, the AC-DC power converter of an electrolytic unit is configured to regulate the DC power to any percentage of the rated capacity of the electrolytic cell of that electrolytic unit. According to embodiments of the invention, the AC-DC power converters are controlled by the converter unit controller. The converter unit controller issues control signals to the AC-DC power converters of the electrolytic units. Each AC-DC power converter receives a signal that specifies the percentage of rated capacity at which its electrolytic unit is to be operated, for example at 100%, at 50%, at 25%, at 0%, etc.

The inventive electrolysis arrangement can be realized at any suitable scale. The only significant constraint is that a generator winding must be able to provide sufficient power so that the AC-DC power converter of an electrolytic unit can deliver the required decomposition potential. With this constraint in mind, it shall be understood that even a relatively small type of wind turbine could be used to drive several small-capacity electrolytic units or assemblies. However, without restricting embodiments of the invention in any way, it may be assumed in the following that a wind turbine of the inventive electrolysis arrangement is a horizontal axis wind turbine of the type most commonly used in present-day wind parks. Such wind turbines can have rated power output in the order of several megawatt and can drive multiple high-capacity electrolytic units for large-scale electrolysis. The inventive electrolysis arrangement can avail of any number of dedicated wind turbines, for example it may be realized in a wind park configuration using multiple wind turbines that are dedicated to performing electrolysis.

According to embodiments of the invention, each wind turbine has several parallel, independent windings. Each of these can drive a separate electrolytic assembly. In an embodiment of the invention, the electrical generator of a wind turbine comprises at least two armature windings. For example, an 8 MW wind turbine may be constructed to have two windings, four windings, or any number of windings.

An electrolytic assembly could comprise a single electrolytic unit. In such a realization, the DC output of the power converter may need to be limited in order not to exceed the capacity of the electrolytic unit. Therefore, in an embodiment of the invention, each electrolytic assembly comprises a number of electrolytic units with a total capacity that essentially matches the power that can be provided by the corresponding generator winding. In the case of a two-winding 8 MW wind turbine, for example, an electrolytic assembly can comprise four units, each with a 2 MW electrolysis cell/stack.

When the wind turbine is operated at its rated power, it is able to drive all loads, i.e. it can drive all electrolytic assemblies. In lower wind conditions, the wind turbine will operate below its rated power and may not be able to provide enough power to drive all electrolytic assemblies. An embodiment of the inventive method comprises the steps of determining the power output of the electrical generator of a wind turbine, selecting a number of electrolytic units that are to be driven by the available power, and regulating the AC-DC power converters of the selected electrolytic units, for example by issuing control signals to the corresponding AC-DC power converters to increase the DC power to 100% of the rated capacity of each unit.

The remaining units are inactive, for example by issuing control signals to the corresponding AC-DC power converters to reduce the DC power to zero. These units can later resume the process of electrolytic conversion, for example when the wind speed increases.

In a further embodiment of the invention, the electrolysis arrangement comprises a switch between each armature winding and its electrolytic assembly, and a switch controller configured to actuate the switches. A switch may need to be opened for various reasons, for example to reduce no-load losses, or to isolate a defective component—for example to isolate a faulty power converter or a faulty electrolytic unit—in order to restrict the system to operational components only.

In an embodiment of the invention, an electrolytic cell is constructed to perform electrocatalytic conversion of water into hydrogen and oxygen. The inventive method can be applied to the large-scale efficient production of hydrogen, which has various commercial uses, for example to power fuel cells.

Electrolysis of water requires that the water be purified to remove contaminants such as salt. Therefore, when the inventive electrolysis arrangement is realized using offshore wind turbine, it further comprises a desalination module to desalinate sea-water. The desalination module can be realized as a multi-stage flash distillation module, a multiple-effect distillation module, a vacuum vapor-compression distillation module etc., and may comprise further components for purification and de-ionizing the desalinated water. The output of such a desalination module is then purified water suitable for feeding an electrolysis stack.

In an alternative embodiment, an electrolytic cell can be realized to perform electrocatalytic conversion of atmospheric carbon dioxide into a gas such as methane, ethylene, ethane, etc.

To power the devices that provide the input (purified $H_2O$, atmospheric $CO_2$, etc.) to the electrolytic units and to power other auxiliary wind turbine devices, the inventive electrolysis arrangement may also comprise a dedicated power supply such as an additional wind turbine that is used in the conventional manner to generate electricity. However, in an embodiment of the invention, a part of the electrical power produced by the generator can be used to power such devices as required, with the remaining electrical power of that wind turbine being used to drive electrolytic assemblies.

In one embodiment of the inventive electrolysis arrangement, the electrolytic units of an electrolytic assembly may perform the same type of electrolysis (e.g., purified water to $H_2$ and $O_2$), and may all have the same capacity; furthermore the electrolytic assemblies may all be essentially identical. However, such an embodiment is not a requirement, and the inventive electrolysis arrangement can be realized with any practicable configuration of electrolytic units, for example utilizing a mix of different capacities and/or different types of electrolysis.

BRIEF DESCRIPTION

Some of the embodiments will be described in detail, with reference to the following figures, wherein like designations denote like members, wherein.

DETAILED DESCRIPTION

Figure 1:
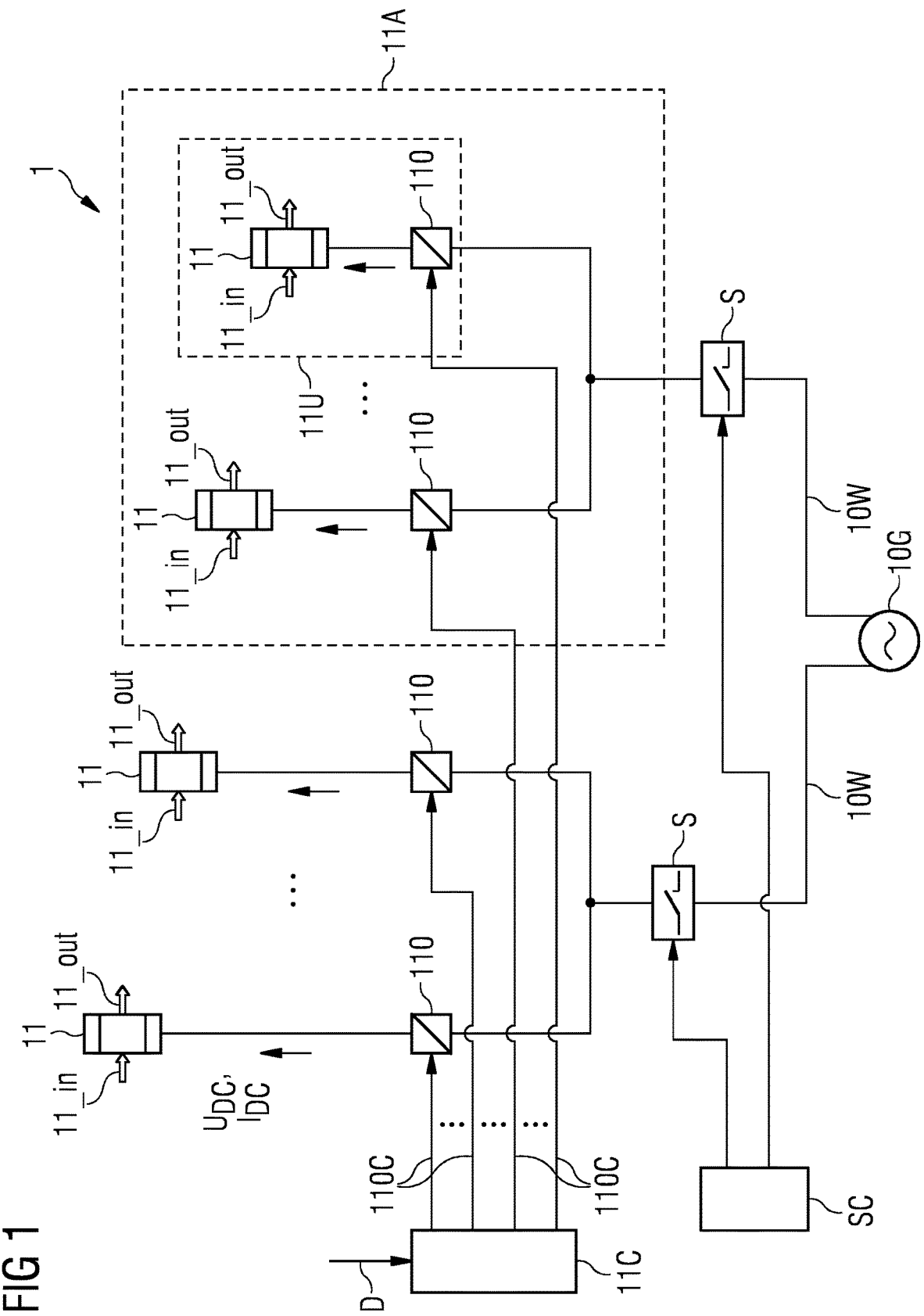
FIG. 1 shows embodiments of the inventive electrolysis arrangement.
Figure 2:
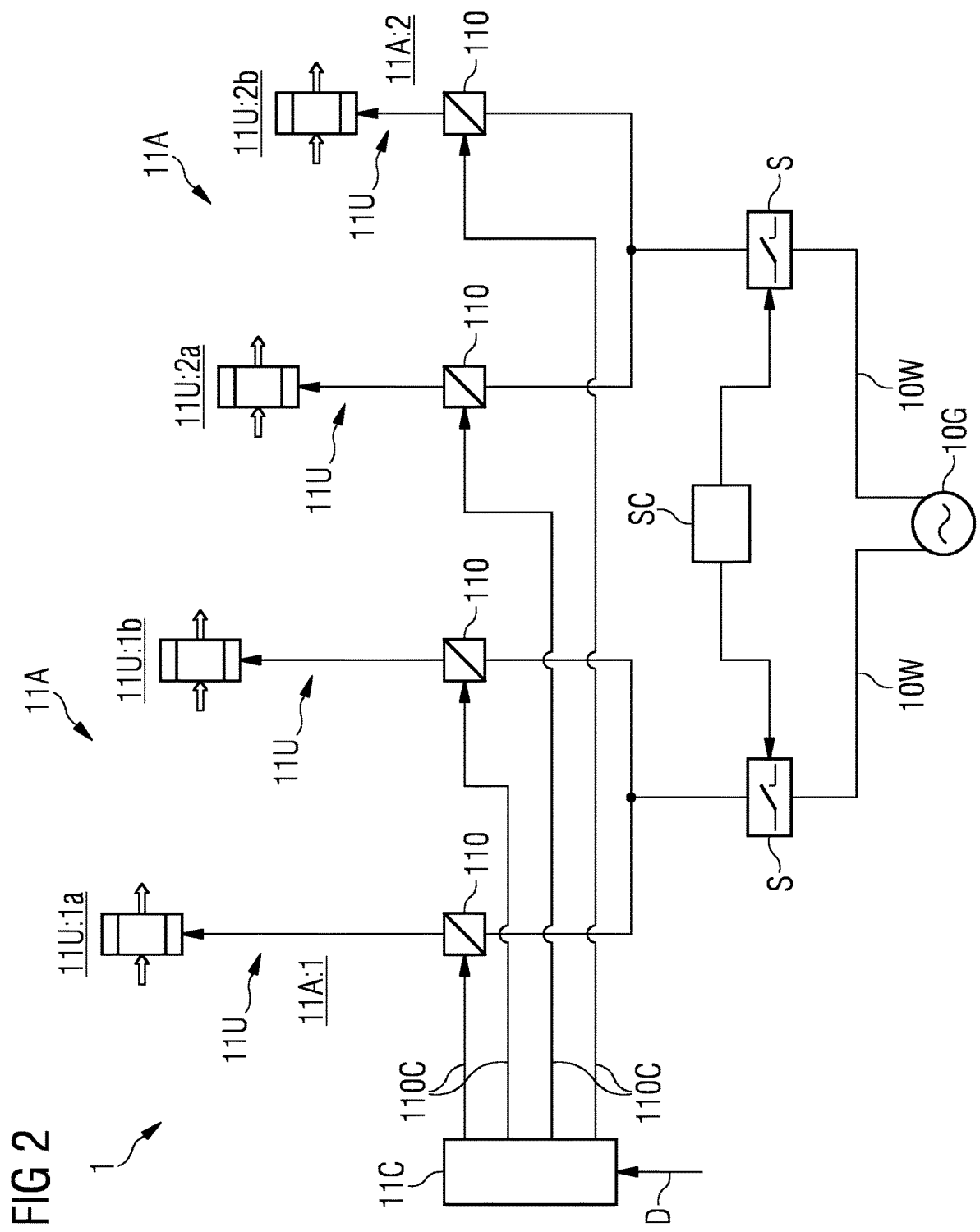
FIG. 2 shows a simplified embodiment with a generator which drives an electrolytic assembly.
Figure 3:
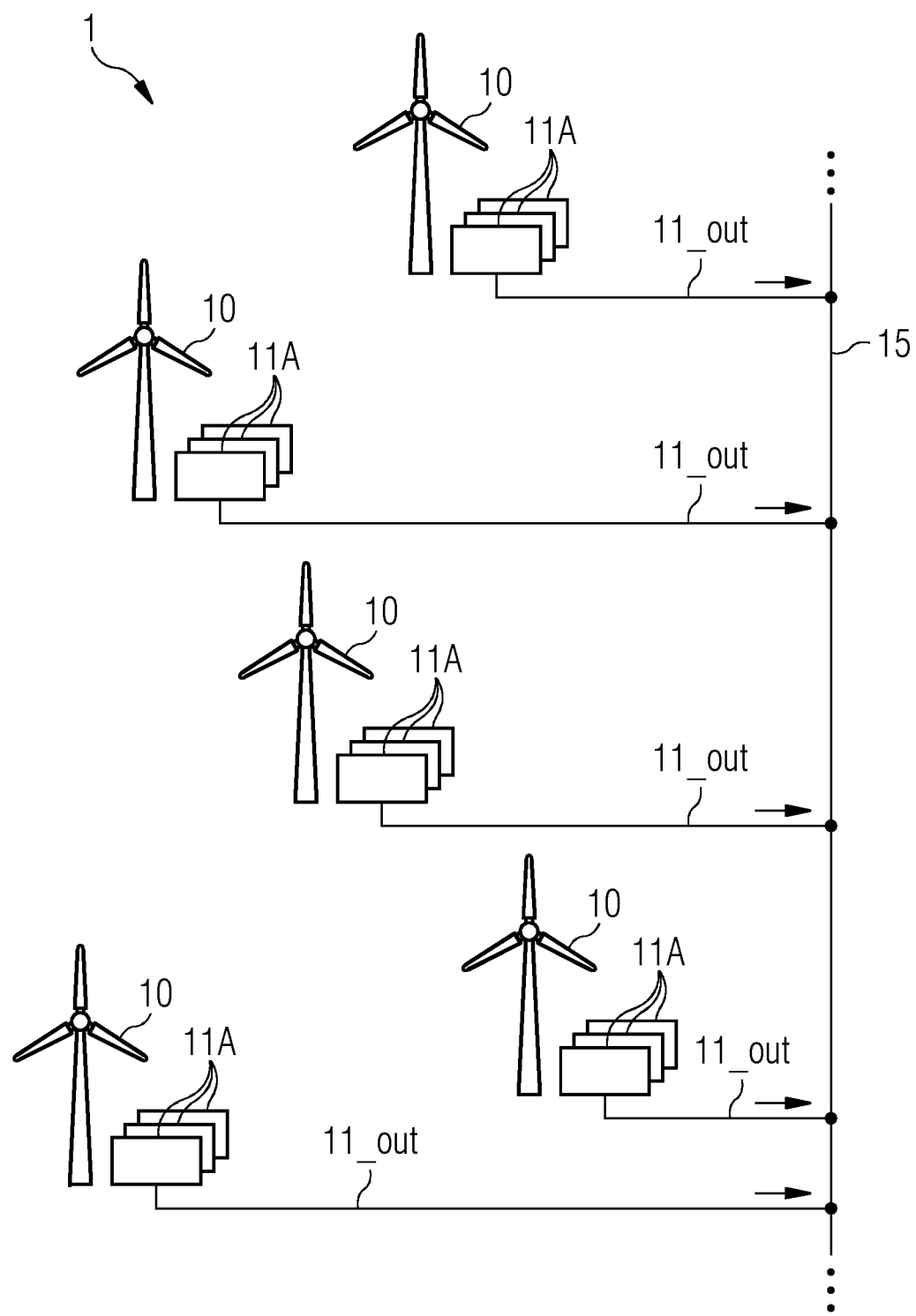
FIG. 3 shows the electrolysis arrangement can comprise several offshore wind turbines.

FIGS. 1-3 show simplified block diagrams to illustrate the inventive electrolysis arrangement 1. As shown in FIG. 3, the electrolysis arrangement 1 can comprise several offshore wind turbines 10. FIG. 1 shows the generator 10G of one such wind turbine, for example, a 8 MW generator 10G that has two windings 10W. Each winding 10W can therefore produce up to 4 MW of AC power when the wind turbine is running at its rated output.

Each winding 10W is connected—by means of a switch S—to an electrolytic assembly 11A. The switches are controlled by a switch controller SC.

The components that together comprise an electrolytic assembly 11A are collectively indicated by a bounding rectangle drawn with a broken line. Each electrolytic assembly 11A comprises a number of electrolytic units 11U, each with an AC-DC power converter 110 and an electrolysis cell 11 or stack 11. The components that together comprise an electrolytic unit 11U are collectively indicated by the bounding rectangle at the lower part of the diagram (drawn with a dotted line).

A converter unit controller 11C issues control signals 110C for each AC-DC power converter 110. A control signal 110C for a power converter 110 specifies the fraction of rated power that is to be provided to the corresponding cell 11. The converter unit controller 11C may receive data D from a wind turbine controller or similar (for example the quantity of rated power that is being generated) in order to determine the available power that can be distributed between the electrolytic assemblies 11A. Each AC-DC power converter 110 converts an AC input to a DC voltage UDC and a DC current IDC at levels determined by the control signal 110C it received from the converter unit controller 11C.

An electrolysis stack 11 is fed with an input material 11_in, and its output 11_out can be one or more products. For example, water electrolysis can be done on purified water 11_in with the addition of a suitable electrolyte, and the output 11_out in this case is hydrogen $H_2$ and/or oxygen $O_2$.

The number of electrolysis stacks 11 that can be operational at any one time will depend on the available power, which in turn depends on the wind speed. FIG. 2 shows a simplified embodiment with a generator 10G that has two windings 10W, each of which drives an electrolytic assembly 11A, and each electrolytic assembly 11A comprises two electrolytic units 11U. The two electrolytic assemblies are labelled 11A:1 and 11A:2; the two electrolytic units of the first electrolytic assembly 11A:1 are labelled 11U:1a and 11U:1b; and the two electrolytic units of the second electrolytic assembly 11A:2 are labelled 11U:2a and 11U:2b. The available power may be distributed among the electrolytic units so that an optimum utilization is achieved. The following table illustrates an exemplary distribution:

| Power | 11A:1 | 11U:1a | 11U:1b | 11A:2 | 11U:2a | 11U:2b |
|---|---|---|---|---|---|---|
| 100% | 50 | 25 | 25 | 50 | 25 | 25 |
| 60% | 36 | 20 | 16 | 24 | 12 | 12 |
| 40% | 40 | 20 | 20 | 0 | 0 | 0 |
| 20% | 20 | 20 | 0 | 0 | 0 | 0 |

At 100% capacity, the power output of the generator is evenly distributed over both electrolytic assemblies. At full generator power, each electrolytic unit 11U is driven by 25% of the available power.

The second row illustrates a situation in which the wind speed drops so that the power output of the generator reduces to 60%. Here, the available power is distributed so that the first electrolytic assembly 11A:1 is driven by 36% of full power, while the second electrolytic assembly 11A:2 is driven by 24% of full power. The electrolytic units 11U:1a and 11U:1b of the first electrolytic assembly 11A:1 are driven at 20% and 16% of full power respectively, while the electrolytic units 11U:2a and 11U:2b of the second electrolytic assembly 11A:2 are each driven at 12% of full power.

The third row illustrates a situation in which the wind speed drops even further, so that the power output of the generator reduces to 40%. This power is generated in a single winding. Here, the second electrolytic assembly 11A:2 is "removed", e.g., by opening the corresponding switch or by issuing appropriate control signals to the converter unit controller. The available power is dedicated to the first electrolytic assembly 11A:1, and its electrolytic units 11U:1a and 11U:1b are driven at 20% and 20% of full power respectively.

The fourth row of the table illustrates a situation in which the wind speed drops even further, so that the power output of the generator reduces to 20%. Again, this power is generated in a single winding, and the second electrolytic assembly 11A:2 remains disconnected. The available power is dedicated to the first electrolytic assembly 11A:1 but is only enough to efficiently drive a single electrolytic units 11U:1a. The other electrolytic unit 11U:1b is not driven.

FIG. 3 shows a further embodiment of the inventive electrolysis arrangement 1. Here, the diagram indicates several wind turbines 10, for example in a wind park configuration. The collective outputs 11_out of the electrolysis assemblies 11A feed into a pipeline 15, for example a pressurized hydrogen pipeline for transporting hydrogen to an onshore facility.

Although the present invention has been disclosed in the form of embodiments and variations thereon, it will be understood that numerous additional modifications and variations could be made thereto without departing from the scope of the invention. For example, a wind turbine generator may have a single winding that provides power to a single electrolytic assembly. In such a realisation, electrolysis can be performed when there is sufficient wind energy to drive the complete electrolytic assembly.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An electrolysis arrangement comprising:
   a plurality of electrolytic units, wherein each electrolytic unit comprises an electrolytic cell and an AC-DC power converter configured to provide DC power for that electrolytic cell;
   a plurality of electrolytic assemblies, wherein each electrolytic assembly comprises a number of electrolytic units of the plurality of electrolytic units;
   at least one wind turbine comprising an electrical generator with a number of armature windings, wherein each armature winding provides AC power to one electrolytic assembly of the plurality of electrolytic assemblies; and
   a converter unit controller configured to control the AC-DC power converters of respective electrolytic units of the plurality of electrolytic units on the basis of the power output of the electrical generator.

2. The electrolysis arrangement according to claim 1, wherein each AC-DC power converter is configured to provide a percentage of rated DC power of the corresponding electrolytic cell.

3. The electrolysis arrangement according to claim 1, wherein the converter unit controller is configured to regulate the respective AC-DC power converters of the respective electrolytic units to distribute available power over an optimum number of electrolytic units of the plurality of electrolytic units.

4. The electrolysis arrangement according to claim 1, wherein the respective AC-DC power converters of the respective electrolytic units are respective DC current controllers configured to control the current density of the respective electrolytic units.

5. The electrolysis arrangement according to claim 1, comprising a switch between each armature winding and the one electrolytic assembly provided with AC power by the respective armature winding, and a switch controller configured to actuate the switch.

6. The electrolysis arrangement according to claim 1, wherein each electrolytic assembly comprises at least two electrolytic units of the plurality of electrolytic units.

7. The electrolysis arrangement according to claim 1, wherein the electrolytic cell of at least one electrolytic unit of the plurality of electrolytic units is constructed to perform electrocatalytic conversion of water into hydrogen and oxygen.

8. The electrolysis arrangement according to claim 1, comprising a desalination module configured to desalinate seawater to obtain water for the electrolytic cell of at least one electrolytic unit of the plurality of electrolytic units.

9. The electrolysis arrangement according to claim 1, wherein the electrolytic cell of at least one electrolytic unit of the plurality of electrolytic units is constructed to perform electrocatalytic conversion of carbon dioxide into a further gas.

10. The electrolysis arrangement according to claim 1, wherein the number of armature windings comprises at least two armature windings.

11. The electrolysis arrangement according to claim 1, wherein the electrical generator is further configured to provide power to a further component of the electrolysis arrangement.

12. The electrolysis arrangement according to claim 1, wherein the at least one wind turbine comprises a plurality of wind turbines.

13. A method of operating the electrolysis arrangement according to claim 1 comprising the steps of:
   operating the electrical generator of the at least one wind turbine to generate AC power in one or more of the at least one armature windings and, on the basis of the generated AC power,
   regulating the respective AC-DC power converters of the respective electrolytic units of the respective electrolytic assemblies connected to the one or more of the at least one armature windings.

14. The method according to claim 13, further comprising determining the power output of the electrical generator of the at least one wind turbine;
   selecting a subset of the plurality of electrolytic units to be driven; and
   regulating the respective AC-DC power converters of the selected subset of the plurality of electrolytic units.

15. The method according to claim 13, further comprising opening a switch between the one or more of the at least one armature windings and the respective electrolytic assembly connected to the one or more of the at least one armature windings to isolate a faulty component.

16. An electrolysis arrangement comprising:
   a first electrolytic assembly including a first electrolytic unit, wherein the first electrolytic unit comprises a first electrolytic cell and a first AC-DC power converter configured to provide DC power for the first electrolytic cell;
   a second electrolytic assembly including a second electrolytic unit, wherein the second electrolytic unit comprises a second electrolytic cell and a second AC-DC power converter configured to provide DC power for the second electrolytic cell;
   at least one wind turbine comprising an electrical generator with a first armature winding and a second armature winding, wherein the first armature winding provides AC power to the first electrolytic assembly and the second armature winding provides AC power to the second electrolytic assembly; and
   a converter unit controller configured to control the first AC-DC power converter and the second AC-DC power converter on the basis of a power output of the electrical generator.

17. The electrolysis arrangement of claim 16, wherein the first electrolytic assembly includes a third electrolytic unit, wherein the third electrolytic unit comprises a third electrolytic cell and a third AC-DC power converter configured to provide DC power for the third electrolytic cell.

18. The electrolysis arrangement of claim 17, wherein the second electrolytic assembly includes a fourth electrolytic unit, wherein the fourth electrolytic unit comprises a fourth electrolytic cell and a fourth AC-DC power converter configured to provide DC power for the fourth electrolytic cell.

* * * * *